United States Patent [19]
Blanchard et al.

[11] Patent Number: 5,862,132
[45] Date of Patent: Jan. 19, 1999

[54] SYSTEM AND METHOD FOR MULTIPLE ACCESS SHORT MESSAGE COMMUNICATIONS

[75] Inventors: Scott David Blanchard, Mesa; Kenneth Solomon Wreschner, Chandler; Douglas Paul Dobson, Gilbert; Marc David Brack, Chandler, all of Ariz.

[73] Assignee: Motorola, Inc., Schaumburg, Ill.

[21] Appl. No.: 636,051

[22] Filed: Apr. 22, 1996

[51] Int. Cl.⁶ .............................. H04B 7/212; H04B 7/216
[52] U.S. Cl. ........................ 370/342; 370/347; 370/350; 370/515; 375/201; 455/450
[58] Field of Search ..................................... 370/330, 335, 370/337, 342, 347, 350, 436, 441, 442, 503, 514, 515; 375/200, 201, 202, 203, 205, 206, 208, 209, 210, 356; 455/450, 451, 500, 502

[56] References Cited

U.S. PATENT DOCUMENTS

| | | | |
|---|---|---|---|
| 5,222,098 | 6/1993 | Yamamoto et al. | 375/201 |
| 5,260,967 | 11/1993 | Schilling | 370/342 |
| 5,410,568 | 4/1995 | Schilling | 370/342 |
| 5,410,588 | 4/1995 | Ito | 370/350 |
| 5,430,731 | 7/1995 | Umemoto et al. | 370/337 |
| 5,481,533 | 1/1996 | Honig et al. | 370/335 |
| 5,511,068 | 4/1996 | Sato | 370/335 |
| 5,519,710 | 5/1996 | Otsuka | 370/350 |
| 5,533,013 | 7/1996 | Leppanen | 370/347 |
| 5,568,472 | 10/1996 | Umeda et al. | 370/342 |

Primary Examiner—Alpus H. Hsu
Attorney, Agent, or Firm—Bradley J. Botsch, Sr.

[57] ABSTRACT

The present invention describes a communications system that utilizes frequency division multiple access (FDMA), code division multiple access (CDMA), and time division multiple access (TDMA) techniques for providing efficient use of frequency spectrum while supporting a large number of transmitters/users (2–6). Many users of the communications system share a common frequency band, but each transmit their respective message bursts (50) at different and specific times via a TDMA technique. To facilitate synchronization of the TDMA technique, each transmitter of the system is synchronized to a common timing reference (1) thereby abating the need to maintain synchronization between the transmitters (2–6) and receivers (8–12) of the system. Each TDMA message is then transmitted via a spread spectrum technique by multiplying (82) the message burst to be transmitted by a pseudo-random sequence of ones and zeroes (84) and transmitting such spread spectrum message burst for reception by one or more receivers within the system.

20 Claims, 2 Drawing Sheets

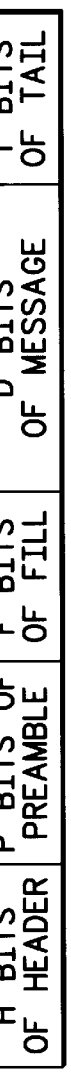
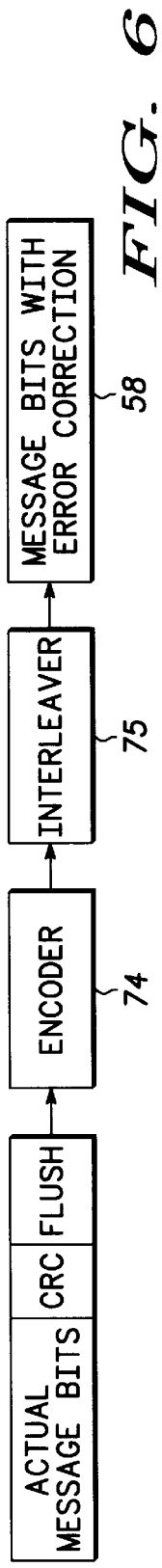
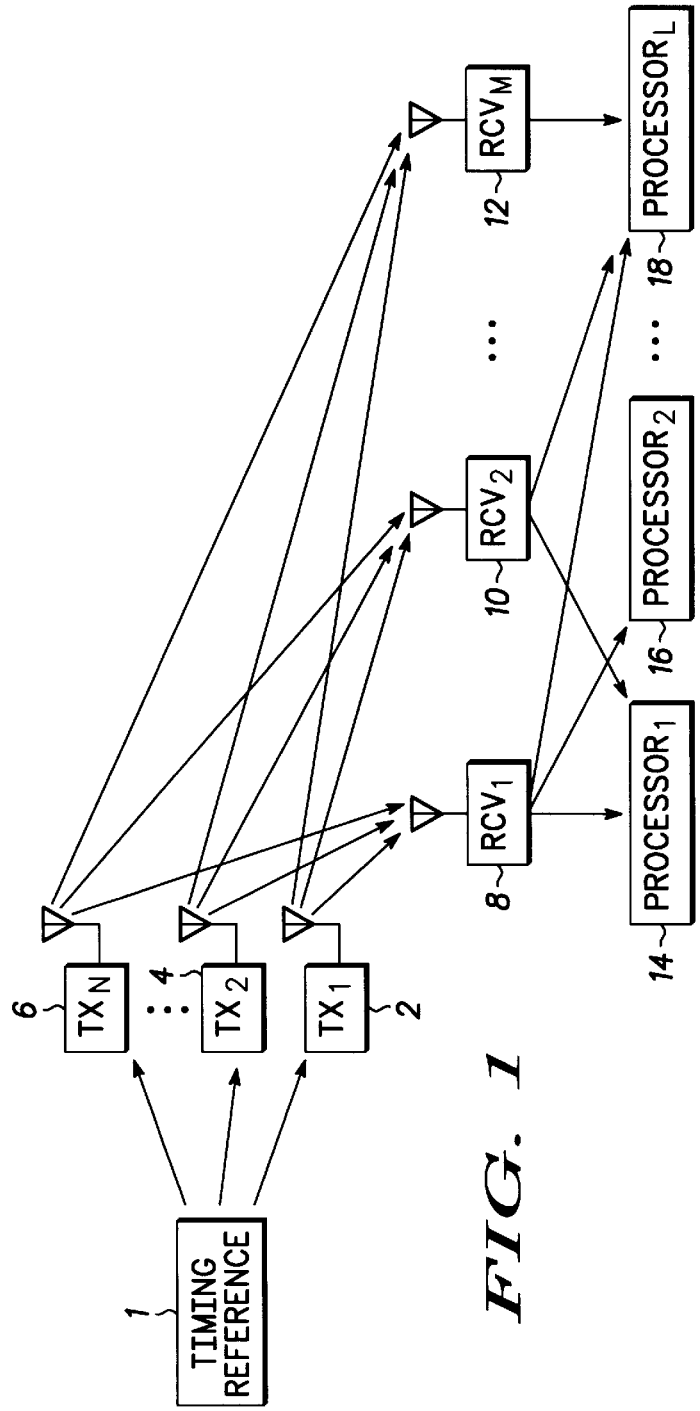

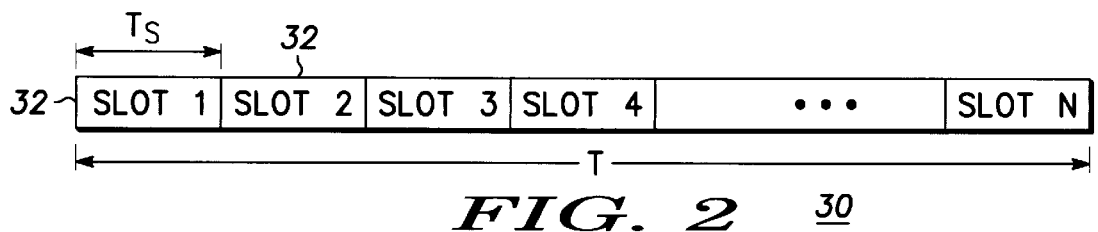
FIG. 2
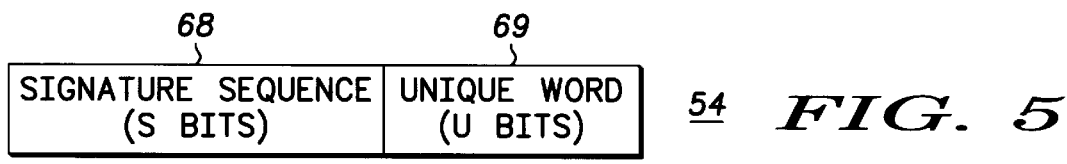
FIG. 3
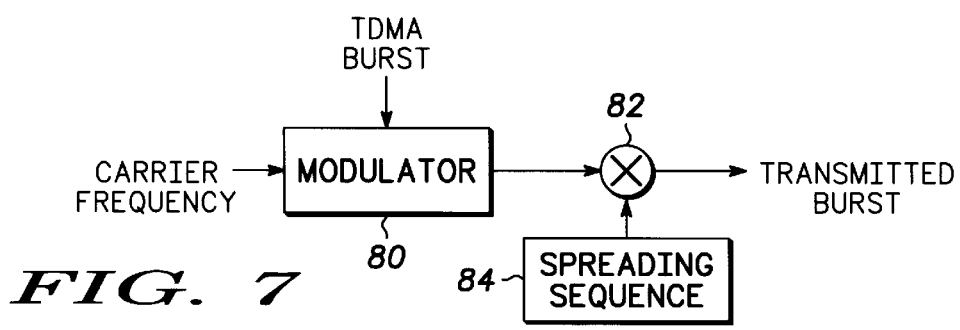
FIG. 5
FIG. 7

SYSTEM AND METHOD FOR MULTIPLE ACCESS SHORT MESSAGE COMMUNICATIONS

BACKGROUND OF THE INVENTION

This invention relates to a multiple access communication systems and, in particular, to a communications system utilizing frequency division, code division and time division multiple access techniques for providing efficient use of frequency spectrum while supporting a large number of transmitters sharing a common frequency band by having all transmitters synchronized to a common timing reference.

Frequency division multiple access (FDMA) systems involve assigning each user a specific frequency for its respective transmission. Accordingly, a high number of users within an FDMA system requires a large frequency band. For example, if ten users are desired within an FDMA system, ten separate and independent frequencies would be required.

Time division multiple access (TDMA) systems involve multiple users sharing a common frequency but each user transmits at a specific time and only for a predetermined time period. Accordingly, each TDMA user does not transmit continuously but only in its specific time slot. Therefore, for ten users within a TDMA system, each one would transmit only one-tenth of the total transmission time. Furthermore, since each user within a TDMA system is transmitting only a portion of the time, each user will be required to transmit at high rates over a shorter time interval as the number of users increase. TDMA systems also require some form of synchronization between the transmitter and its respective receiver.

Code division multiple access (CDMA) systems involve each user transmitting at the same time and at the same frequency. Further, CDMA systems perform spread spectrum techniques by multiplying the transmit sequence by a pseudo-random pattern of ones and zeros of which the receiver to receive the transmitted sequence knows. However, while CDMA systems have a "soft-capacity" in that additional users may be added with only slight system degradation, such systems are not efficient when transmitting only short bursts of data at low duty cycles.

Hence, there exists a need for an improved communications system for providing efficient use of frequency spectrum while supporting a large number of transmitters sharing a common frequency band by having all transmitters synchronized to a common timing reference and, thus, not requiring synchronization between transmitters and receivers.

BRIEF DESCRIPTION OF THE DRAWINGS

A more complete understanding of the present invention may be derived by referring to the detailed description and claims when considered in conjunction with the drawings, wherein like reference numbers refer to similar items throughout the drawings; and wherein FIG. 1 is a block diagram illustrating a communication system in accordance with the present invention;

FIG. 2 is a pictorial diagram illustrating the TDMA frame structure of the communication system of FIG. 1;

FIG. 3 is a pictorial diagram illustrating a superframe including m frames similar to the TDMA frame of FIG. 2;

FIG. 4 is a pictorial diagram illustrating the structure of a TDMA burst within each defined time slot of a superframe of FIG. 3;

FIG. 5 is a pictorial diagram illustrating a more detailed format of the preamble bits within the TDMA burst of FIG. 4;

FIG. 6 is a pictorial diagram is shown illustrating the generation of the d message bits within the TDMA burst of FIG. 4; and FIG. 7 is a block diagram illustrating the transmission of a TDMA burst using a CDMA technique.

DETAILED DESCRIPTION OF THE DRAWINGS

The present invention describes a communications system that utilizes frequency division multiple access (FDMA), code division multiple access (CDMA), and time division multiple access (TDMA) techniques for transmitting bursts of data while efficiently using the frequency spectrum and supporting a large number of transmitters/users. Many users of the communications system share a common frequency band, but each transmit their respective message bursts of data at different and specific times via a TDMA technique, as defined by the system. To facilitate synchronization of the TDMA technique, each transmitter of the system is synchronized to a common timing reference thereby abating the need to maintain synchronization between the transmitters and receivers of the system.

Each TDMA burst of data, i.e., message, is then transmitted via a spread spectrum technique by multiplying the burst of data to be transmitted by a pseudo-random sequence of ones and zeroes and transmitting such spread spectrum burst of data for reception by one or more receivers within the system.

The TDMA technique of the present invention utilizes a TDMA superframe structure that is comprised of a plurality of TDMA frames whereby each TDMA frame includes a predetermined number of specific time slots for transmitting each burst of data. In this manner, different users can be transmitting at different rates because some users may be transmitting once per frame, some users at once every two frames, and even some users may transmit at as little as once every superframe.

Referring to FIG. 1, a block diagram illustrating a communications system in accordance with the present invention is shown. The system includes N transmitters as denoted by reference numbers 2–6 for transmitting bursts of data. Each of the N transmitters receives a signal from timing reference 1 for supplying each of the transmitters with a precise time reference having time knowledge such as time of day, master frame counter, or super frame counter, and a precise timing signal such as a 1 pulse per second (PPS) signal from a GPS system, or a similar type signal from a LORAN system, or a frame strobe.

Such timing reference 1 allows each of the transmitters to transmit bursts of data at precise times and for precise time intervals. To that end, each one of the transmitters 2–6 are assigned the following TDMA information by the communications system for specifying a transmit opportunity for each transmitter: (i) a time slot in which they are allowed to transmit, (ii) a position within the framing structure, (iii) an interval between successive transmissions, (iv) a spreading code to be used for transmission, and (v) a frequency for transmission. The frequency assigned to each transmitter may be an absolute single frequency or it could be a alternated between a plurality of frequencies or a sequence of frequencies to transmit at as in a hopping sequence.

Each of the N transmitters 2–6 transmit their information (bursts of data) to M receivers as denoted by reference numbers 8–12. It is important to note that each receiver does not have to receive the transmitted signal from all transmitters. Additionally, a single receiver may receive the transmission from one, two or more transmitters. Further, no synchronization between the transmitters and receivers is needed because the transmitters are all synchronized to a common timing reference 1, as described above.

The communication system also includes L processors as denoted by reference numbers 14–18 which are coupled to the M receivers 8–12 whereby not all processors need not be coupled to all receivers.

As an application of the above described communications system, transmitters 2–6 may be provided and affixed to trucks of a specific company whereby the receivers would be located to provide adequate coverage in the desired area where the trucks may roam. For example, the receivers may be strategically positioned throughout a city for tracking the trucks through the specific city or they may be located on satellites for tracking the position of trucks nationwide or worldwide. In such an application, the transmitters 2–6 would transmit to the receivers information identifying its specific location as well as other information, warning messages, or the like. The receivers 8–12 will receive such transmitted messages and processors 14–18 may be used to determine what information has been transmitted. Further, in this example, the multiple processors may be status displays at various warehouses or different trucking companies headquarters.

Referring to FIG. 2, a pictorial diagram illustrating the TDMA frame structure of the communications system of FIG. 1 is shown. TDMA frame 30 includes a plurality of slots as denoted by slot 1 through slot N and identified by reference number 32. In a preferred embodiment, the time interval for each slot ($T_s$) is 100 milliseconds and N is 600. Accordingly, the time associated with one TDMA frame 30 ($T_{frame}$) is 60 seconds. In determining the time for each slot ($T_s$), consideration is given to the amount of information desired to be transmitted per slot. Further, in determining frame time ($T_{frame}$), consideration is given to the minimum time interval between transmissions of users.

Referring now to FIG. 3, superframe 40 is illustrated which includes M frames similar to TDMA frame 30 of FIG. 2. As shown, superframe 40 includes M frames and each having N times slots. Accordingly, a total of M×N time slots are available for transmission per superframe. Referring back to the above example, for a time slot of 100 milliseconds and N=600, if M=10, then each superframe 40 has a duration of 10 minutes and provides a total of 6,000 time slots whereby the number of frames M in a superframe is determined by considering the maximum time interval between transmissions.

Within each superframe, many users may be transmitting via the plurality of M×N time slots with one user transmitting per each time slot. Moreover, each of the users may be transmitting at different rates from the other users. For example, one user may transmit once per frame (i.e., M times per superframe) while other users may transmit once every two frames (i.e., M/2 times per superframe). Further, some users may just transmit once per superframe. Accordingly, as mentioned above, each user is assigned a slot number, a frame position number and an interval number. In particular, the time slot number defines which slot within a frame the user will transmit, the frame position number defines the first frame in which the user will transmit, and the interval number defines the number of frames between transmissions. As an example, if user A was assigned a slot number of 1, a frame position number of 1, and an interval number of 1, user a would transmit in the time slots denoted with the letter A in superframe 40 and, thus, would transmit M times per superframe. Likewise, if a user B was assigned the slot number of 2, a frame number of 1, and an interval number of 2, user B would transmit in the time slots as denoted with the letter B in superframe 40 and, thus, would transmit M/2 times per superframe. Similarly, if a user C was assigned a slot number of 4, a frame position number of 4, and an interval number of M (where m is the total number of frames per superframe), then user C would transmit in the time slot as labeled C in superframe 40 and would transmit only once per superframe. Accordingly, some users are transmitting every sixty seconds (per frame), some users may be transmitting every other frame (every two minutes), while some may be transmitting once every ten minutes (once per superframe). Accordingly, the communication system of the present invention has the capability of assigning different users more transmission bandwidth based upon their needs through the above-described superframe allocation.

Referring to FIG. 4, the structure of a TDMA burst 50, within each defined time slot of superframe 40 is shown. TDMA burst 50 includes h bits of header as identified by block 52 where h is selected based on the time it takes for the transmitter to settle and to reduce spectral splatter. In a preferred embodiment, three bits of header were chosen.

TDMA burst 50 also includes p bits of preamble as identified in block 54 whereby p is selected for the probability of reception of the message and, in a preferred embodiment, p was chosen to be 32 bits.

Next, TDMA burst 50 includes f bits of fill as denoted by block 56 whereby the f bits of fill are used to allow some time for the receiver between the p bits of preamble and the message bits to follow. The number of fill bits is selected considering the receiver processing time requirements and burst efficiency. In a preferred embodiment, f was chosen to be zero so as to maximize burst efficiency.

TDMA burst 50 also includes d bits of data message as denoted in block 58. In a preferred embodiment, 332 bits of message were used.

Next, TDMA burst 50 includes t bits of tail as denoted by block 60 which are used to allow the time for the transmitter to turn off.

TDMA burst 50 is shorter in duration than the time interval for each slot (Ts), whereby no transmission occurs for some time interval after the transmission of the TDMA burst and before the beginning of the next time slot. This time interval is selected considering the distance between transmitters and receivers to account for the time it takes for a transmitted message to reach a receiver, to the accuracy and jitter of the time reference between receivers, and to preventing overlap with other messages. In a preferred embodiment, this time interval was selected to be 20 milliseconds.

Referring to FIG. 5, a more detailed format of the preamble bits of block 54 of FIG. 4 is shown. In particular, FIG. 5 illustrates preamble block 54 as including a signature sequence block 68 of length s and a unique word block 69 of length u bits whereby s+u=p bits. In a preferred embodiment, p=32 as mentioned and s and u=16.

The signature sequence block 68 includes s bits that are different for each spreading code as a sequence are orthogonal, thereby providing good cross correlation properties between the different CDMA channels.

Unique word block 69 includes u bits whereby each of the transmitters share the same unique word thereby providing good auto correlation properties for each CDMA channel and for improving bit synchronization in the receiver.

Referring to FIG. 6, a pictorial diagram is shown illustrating the generation of the d message bits as shown in block 58 of FIG. 4. FIG. 6 illustrates that 144 actual data bits are to be transmitted along with 16 cyclic redundancy check (CRC) bits and 6 flush bits for a total of 166 actual data bits to be transmitted. These bits are sent through encoder 74 for performing forward error correction coding on the 166 bits thereby providing for error correcting capability. One skilled in the art would appreciate that a number of encoders may be used including convolutional encoders, BCH encoders, and Reed-Solomon encoders. In a preferred embodiment, the rate of convolutional encoder 74 was ½ and, thus, 166 actual data bits supplied to the encoder resulted in 332 bits to be transmitted while having the capability of error correcting. The rate of the convolutional encoder 74 may be chosen based upon certain conditions such as expected number of errors, coding gain, and data transmission speed. These encoded bits are sent through interleaver 75 which interleaves the order of the bits prior to transmission to improve the performance of the error correcting capability in the presence of burst errors. The number of flush bits is selected based upon the constraint length of the decoder used in the receiver to insure that a sufficient number of transmitted bits exists to allow for a decision to be made on the last bit of the CRC.

Referring to FIG. 7, a block diagram illustrating the transmission of a TDMA burst using a CDMA technique is shown. A TDMA burst having a structure as shown in FIG. 4 is modulated with a carrier frequency via modulator 80. The resultant modulated signal is multiplied with a spreading sequence as generated by PN generator/spreading sequence block 84 for transmitting an output burst that includes the specific TDMA burst at its specific time slot at the frequency of the carrier frequency while its spectrum is spread over a predetermined frequency range via spreading sequence 84. Through the use of such a CDMA spectrum spreading technique, more than one of the transmitters may transmit at the same time and at the same frequency. Moreover, it is understood that two or more different carrier frequencies may be used for transmitting information thereby increasing the capacity and robustness of the communications system.

In a preferred embodiment, the PN generator is synchronized to a bit period and, thus, the PN code lasted one bit period and had a defined phase with the beginning of the bit. Further, modulator 80 may take the form of any modulator. For example, modulator 80 may perform differential Bi-Phase-Shift Keying (BPSK) modulation whereby the same PN code for the previous transmitted bit sequence is transmitted if the corresponding bit within the TDMA burst was a logic 0, while the inversion of the PN code for the previous transmitted bit sequence is transmitted if the corresponding bit within the TDMA burst was a logic 1. However, it is understood that many other modulation techniques may be used such as differential BPSK or Quadrature Phase-Shift Keying (QPSK).

The advantages of utilizing a CDMA technique for transmission of the TDMA bursts are its soft capacity limits in that users may be added to the system with only minimal degradation of the system. Further, CDMA systems are more tolerant to interfering signals and may share spectrum with other users. Also, CDMA systems permit rapid synchronization at the receivers.

While the invention has been described in conjunction with specific embodiments thereof, many alternatives, modifications and variations will be apparent to those of ordinary skill in the art in light of the foregoing description. Accordingly, the invention is intended to embrace all such alternatives, modifications and variations as fall within the broad scope of the appended claims.

We claim:

1. A communications system utilizing time division multiple access (TDMA) and code division multiple access (CDMA) techniques for efficiently transmitting bursts of data from a plurality of users at different data rates to one or more receivers within the system, comprising:

a timing reference for generating a precise timing signal and a corresponding precise time reference;

a plurality of transmitters, coupled to the timing reference for providing synchronization between the plurality of transmitters, for transmitting the bursts of data at precise times and time intervals and at a predetermined frequency within a TDMA superframe wherein synchronization between said plurality of transmitters and the one or more receivers is not needed; and wherein the bursts of data is modulated with a carrier and is multiplied with a spreading sequence thereby permitting more than one of the plurality of transmitters to transmit at a same time and at the predetermined frequency.

2. The communications system of claim 1 wherein the TDMA superframe includes a plurality of TDMA frames, each TDMA frame including a plurality of time slots for transmitting the bursts of data whereby each one of the plurality of transmitters is assigned (i) at least one time slot within the plurality of TDMA frames for specifying a transmit opportunity, (ii) a position for specifying a first frame within the TDMA superframe for further specifying a transmit opportunity, and (iii) an interval for specifying a number of frames between transmission of bursts of data for further specifying a transmit opportunity.

3. The communications system of claim 1 wherein each of the bursts of data include:

a predetermined number of header bits for allowing transmitter settling and for reducing spectral splatter;

a predetermined number of preamble bits for improving a probability of reception of message bits;

a predetermined number of the message bits; and a predetermined number of tail bits for allowing transmitter turn-off.

4. The communications system of claim 3 wherein the preamble bits include:

signature sequence bits for providing good cross correlation properties between different CDMA channels; and unique word bits for providing good auto correlation properties for each CDMA channel and improving bit synchronization.

5. The communications system of claim 3 wherein the message bits include bits for providing error correcting capability.

6. The communications system of claim 3 wherein an order of the message bits is interleaved to improve error correcting capability.

7. The communications system of claim 1 wherein the predetermined frequency may be alternated between a plurality of frequencies.

8. In a communications system having a plurality of transmitters for transmitting bursts of data and a plurality of receivers for reception of the bursts of data, a method for allowing the plurality of transmitters to transmit bursts of data at a same time and at a predetermined frequency, the method comprising the steps of:

synchronizing the plurality of transmitters to a common timing reference thereby abating the need to provide synchronization between the plurality of transmitters and the plurality of receivers;

defining a time division multiple access (TDMA) superframe that includes a plurality of TDMA frames whereby each TDMA frame includes a plurality of time slots for transmission of the bursts of data by the plurality of transmitters;

specifying a transmit opportunity for each of the plurality of transmitters including assigning each of the plurality of transmitters (i) a time slot within the plurality of TDMA frames for transmission, (ii) a position for specifying a first frame within the TDMA superframe for transmission, and (iii) an interval for specifying a number of frames between successive transmissions of the bursts of data; and spectrum spreading each of the bursts of data thereby permitting more than one of the plurality of transmitters to transmit at a same time and at the predetermined frequency.

9. In communications system of claim 8 wherein the bursts of data include:

a predetermined number of header bits for allowing transmitter settling and for reducing spectral splatter;

a predetermined number of preamble bits for improving a probability of reception of message bits;

a predetermined number of the message bits; and a predetermined number of tail bits for allowing transmitter turn-off.

10. The communications system of claim 9 wherein the preamble bits include:

signature sequence bits for providing good cross correlation properties between different CDMA channels; and unique word bits for providing good auto correlation properties for each CDMA channel and improving bit synchronization.

11. The communications system of claim 9 wherein the message bits include bits for providing error correcting capability.

12. The communications system of claim 9 wherein an order of the message bits is interleaved to improve error correcting capability.

13. A communications system utilizing time division multiple access (TDMA) and code division multiple access (CDMA) techniques for efficiently transmitting bursts of data, comprising:

means for defining a TDMA superframe for specifying a plurality of time slots for transmitting bursts of data;

a timing reference for generating a precise timing signal and a corresponding precise time reference;

a plurality of transmitters, each coupled to the timing reference, for transmitting bursts of data at precise times and time intervals and at a predetermined frequency within the TDMA superframe wherein the bursts of data is modulated with a carrier and is multiplied with a spreading sequence;

thereby permitting more than one of the plurality of transmitters to transmit at a same time and at the predetermined frequency; and a plurality of receivers for reception of the burst of data by the plurality of transmitters whereby synchronization between the plurality of transmitters and the plurality of receivers is not needed.

14. The communications system of claim 13 wherein the TDMA superframe includes a plurality of TDMA frames, each TDMA frame including the plurality of time slots for transmitting the bursts of data and whereby the means for defining the TDMA superframe includes:

means for defining at least one time slot within the plurality of TDMA frames for specifying a transmit opportunity for each of the plurality of transmitters;

means for defining a position for specifying a first frame within the TDMA superframe for further specifying a transmit opportunity for each of the plurality of transmitters; and means for defining an interval for specifying a number of frames between successive transmission of bursts of data by each of the plurality of transmitters for further specifying a transmit opportunity.

15. The communications systems of claim 13 further including a plurality of processors, coupled to the plurality of receivers, for processing information within the bursts of data.

16. The communications system of claim 13 wherein each of the bursts of data include:

a predetermined number of header bits for allowing transmitter settling and for reducing spectral splatter;

a predetermined number of preamble bits for improving a probability of reception of message bits;

a predetermined number of the message bits; and a predetermined number of tail bits for allowing transmitter turn-off.

17. The communications system of claim 16 wherein the preamble bits include:

signature sequence bits for providing good cross correlation properties between different CDMA channels; and unique word bits for providing good auto correlation properties between CDMA channels and improving bit synchronization.

18. The communications system of claim 16 wherein the message bits include bits for providing error correcting capability.

19. The communications system of claim 16 wherein an order of the message bits is interleaved to improve error correcting capability.

20. The communications system of claim 13 wherein the predetermined frequency may be alternated between a plurality of frequencies.

* * * * *